United States Patent
Roemer et al.

(10) Patent No.: US 10,273,586 B2
(45) Date of Patent: Apr. 30, 2019

(54) ELECTROCHEMICAL CELL

(71) Applicant: PROTON ENERGY SYSTEMS, INC., Wallingford, CT (US)

(72) Inventors: Andrew Roemer, Pomfret Center, CT (US); Blake Carter, Middletown, CT (US); Luke Dalton, Cromwell, CT (US)

(73) Assignee: PROTON ENERGY SYSTEMS, INC., Wallingford, CT (US)

(*) Notice: Subject to any disclaimer, the term of this patent is extended or adjusted under 35 U.S.C. 154(b) by 443 days.

(21) Appl. No.: 14/620,619

(22) Filed: Feb. 12, 2015

(65) Prior Publication Data

US 2015/0233000 A1 Aug. 20, 2015

Related U.S. Application Data

(60) Provisional application No. 61/942,177, filed on Feb. 20, 2014.

(51) Int. Cl.
*C25B 1/10* (2006.01)
*H01M 8/0258* (2016.01)
(Continued)

(52) U.S. Cl.
CPC ............... *C25B 1/10* (2013.01); *C25B 1/08* (2013.01); *C25B 9/04* (2013.01); *C25B 9/08* (2013.01);
(Continued)

(58) Field of Classification Search
CPC .... H01M 8/0258; H01M 8/1004; H01M 8/24; H01M 8/0273; C25B 13/02; C25B 1/10;
(Continued)

(56) References Cited

U.S. PATENT DOCUMENTS 5,879,826 A 3/1999 Lehman et al.
6,168,705 B1 1/2001 Molter et al.
(Continued)

FOREIGN PATENT DOCUMENTS

EP 1505675 A1 2/2005
FR 2816448 A1 5/2002
(Continued)

OTHER PUBLICATIONS

Notification of Transmittal of the International Search Report and the Written Opinion of the International Searching Authority, or the Declaration for International Application No. PCT/U52015/015787 dated Apr. 22, 2015; dated May 21, 2015; 7 pages.
(Continued)

*Primary Examiner* — Stephen J Yanchuk
(74) *Attorney, Agent, or Firm* — Cantor Colburn LLP (57) ABSTRACT

A separator plate and a frame member for an electrochemical cell are provided. The separator plate includes a plurality of protrusions extending therefrom to define a flow field. A pair of end features arranged along opposite sides of the flow field, each end feature extending substantially the length of the flow field. A periphery portion is provided having a first set of openings and a second set of openings. Wherein the plurality of protrusions and pair of end features extend from a plane defined by the periphery portion. The frame member includes features for facilitating assembly and reducing the risk of an over constrained condition. The frame member further having ports divided by a bridge member to support the frame member under operating pressures.

18 Claims, 6 Drawing Sheets

(51) Int. Cl.
*H01M 8/0273* (2016.01)
*C25B 13/02* (2006.01)
*C25B 9/18* (2006.01)
*C25B 9/08* (2006.01)
*H01M 8/2465* (2016.01)
*H01M 8/026* (2016.01)
*C25B 1/08* (2006.01)
*C25B 9/04* (2006.01)
*C25B 9/20* (2006.01)
*H01M 8/242* (2016.01)
*H01M 8/0206* (2016.01)

(52) U.S. Cl.
CPC ............... *C25B 9/18* (2013.01); *C25B 9/20* (2013.01); *C25B 13/02* (2013.01); *H01M 8/0206* (2013.01); *H01M 8/026* (2013.01); *H01M 8/0258* (2013.01); *H01M 8/0273* (2013.01); *H01M 8/242* (2013.01); *H01M 8/2465* (2013.01); *Y02E 60/366* (2013.01)

(58) Field of Classification Search
CPC .... C25B 1/08; C25B 9/18; C25B 9/08; C25B 9/04; C25B 9/20
See application file for complete search history.

(56) References Cited

U.S. PATENT DOCUMENTS

| | | | |
|---|---|---|---|
| 6,368,740 B1 | 4/2002 | Dristy | |
| 6,653,011 B2 | 11/2003 | Dristy | |
| 6,666,961 B1 | 12/2003 | Skoczylas et al. | |
| 6,706,436 B2 | 3/2004 | Molter | |
| 6,828,056 B2 | 12/2004 | Molter et al. | |
| 6,916,443 B2 | 7/2005 | Skoczylas et al. | |
| 7,014,947 B2 | 3/2006 | Speranza et al. | |
| 7,153,802 B2 | 12/2006 | Manco et al. | |
| 7,378,177 B2 | 5/2008 | Hanlon et al. | |
| 7,402,358 B2 | 7/2008 | Hanlon | |
| 7,452,623 B2 | 11/2008 | Henderson | |
| 7,491,463 B2 | 2/2009 | Friedman et al. | |
| 7,507,493 B2 | 3/2009 | Friedman et al. | |
| 7,767,360 B2 | 8/2010 | Friedman | |
| 7,879,207 B2 | 2/2011 | Dalton et al. | |
| 8,338,048 B2 | 12/2012 | Mattejat et al. | |
| 2005/0074652 A1* | 4/2005 | Choi | H01M 8/0258 429/457 |
| 2007/0026288 A1* | 2/2007 | Friedman | H01M 8/023 429/483 |
| 2008/0060937 A1 | 3/2008 | Molter et al. | |
| 2010/0015485 A1 | 1/2010 | Conti et al. | |
| 2010/0190084 A1* | 7/2010 | Shizuku | H01M 4/8615 429/480 |
| 2014/0017600 A1* | 1/2014 | Brandt | H01M 8/0247 429/513 |

FOREIGN PATENT DOCUMENTS

| | | |
|---|---|---|
| RU | 2211885 C1 | 9/2003 |
| RU | 2328060 C1 | 6/2008 |
| RU | 2419921 C2 | 5/2011 |
| WO | 03107462 A2 | 12/2003 |
| WO | 2013136816 A1 | 9/2013 |
| WO | 2015126748 A1 | 8/2015 |

OTHER PUBLICATIONS

European search report and Written Opinion for Application 15 752 664.1 dated Aug. 29, 2017; 7 pgs.

* cited by examiner

ELECTROCHEMICAL CELL

FEDERAL RESEARCH STATEMENT

Portions of this invention were made with Government support under contract no. DE-EE0000276, awarded by the United States Department of Energy. The Government has certain rights in the invention.

BACKGROUND OF THE INVENTION

The present disclosure relates generally to electrochemical cells, and in particular to electrochemical cells having separator plates and frames.

Figure 1:
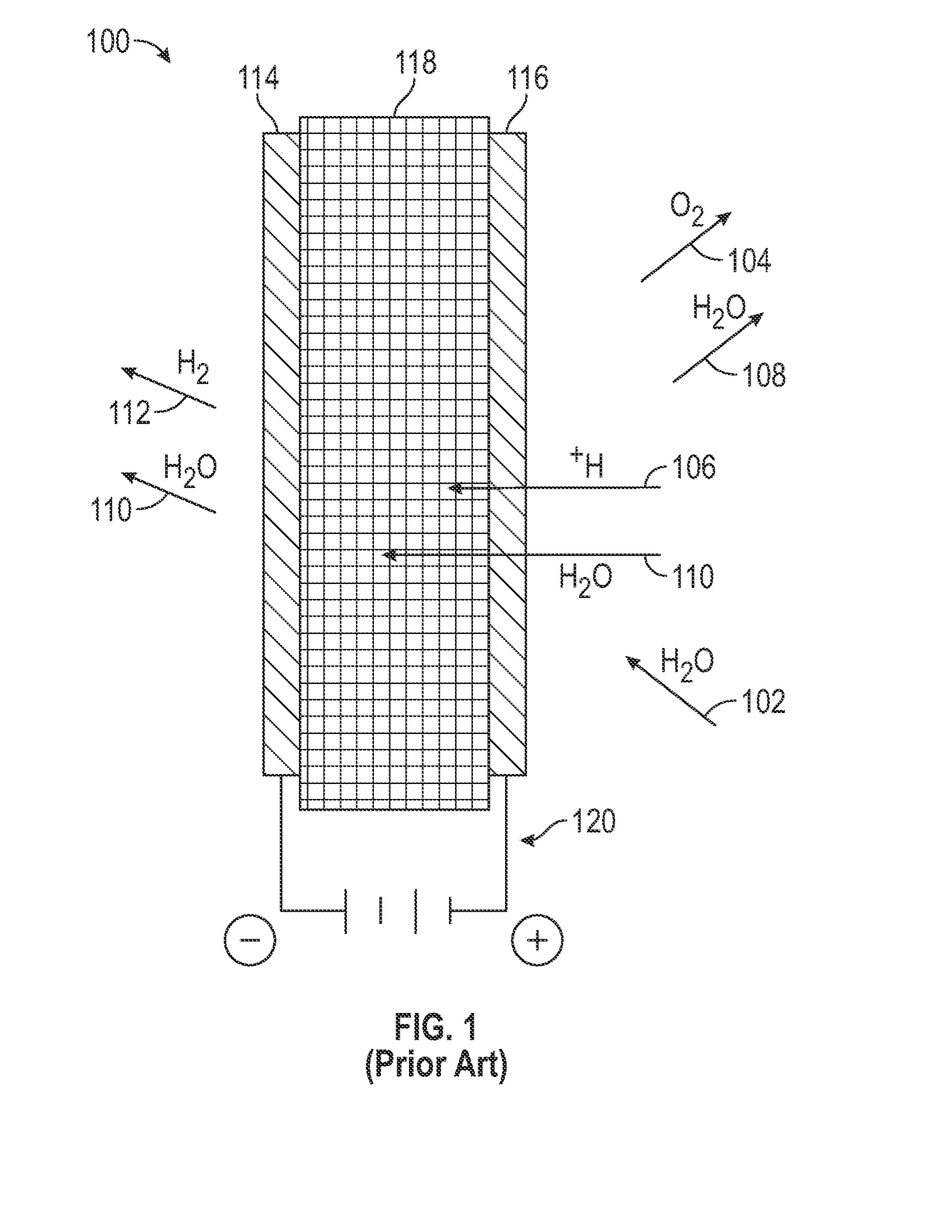
FIG. 1 illustrates a schematic diagram of a partial electrochemical cell showing an electrochemical reaction for use in accordance with embodiments of the invention.

Electrochemical cells are energy conversion devices, usually classified as either electrolysis cells or fuel cells. A proton exchange membrane electrolysis cell can function as a hydrogen generator by electrolytically decomposing water to produce hydrogen and oxygen gas, and can function as a fuel cell by electrochemically reacting hydrogen with oxygen to generate electricity. Referring to FIG. 1, which is a partial section of a typical anode feed electrolysis cell 100, process water 102 is fed into cell 100 on the side of an oxygen electrode (anode) 116 to form oxygen gas 104, electrons, and hydrogen ions (protons) 106. The reaction is facilitated by the positive terminal of a power source 120 electrically connected to anode 116 and the negative terminal of power source 120 connected to a hydrogen electrode (cathode) 114. The oxygen gas 104 and a portion of the process water 108 exits cell 100, while protons 106 and water 110 migrate across a proton exchange membrane 118 to cathode 114 where hydrogen gas 112 is formed.

Another typical water electrolysis cell using the same configuration as is shown in FIG. 1 is a cathode feed cell, wherein process water is fed on the side of the hydrogen electrode. A portion of the water migrates from the cathode across the membrane to the anode where hydrogen ions and oxygen gas are formed due to the reaction facilitated by connection with a power source across the anode and cathode. A portion of the process water exits the cell at the cathode side without passing through the membrane.

A typical fuel cell uses the same general configuration as is shown in FIG. 1. Hydrogen gas is introduced to the hydrogen electrode (the anode in fuel cells), while oxygen, or an oxygen-containing gas such as air, is introduced to the oxygen electrode (the cathode in fuel cells). Water can also be introduced with the feed gas. The hydrogen gas for fuel cell operation can originate from a pure hydrogen source, hydrocarbon, methanol, or any other hydrogen source that supplies hydrogen at a purity suitable for fuel cell operation (i.e., a purity that does not poison the catalyst or interfere with cell operation). Hydrogen gas electrochemically reacts at the anode to produce protons and electrons, wherein the electrons flow from the anode through an electrically connected external load, and the protons migrate through the membrane to the cathode. At the cathode, the protons and electrons react with oxygen to form water, which additionally includes any feed water that is dragged through the membrane to the cathode. The electrical potential across the anode and the cathode can be exploited to power an external load.

In other embodiments, one or more electrochemical cells may be used within a system to both electrolyze water to produce hydrogen and oxygen, and to produce electricity by converting hydrogen and oxygen back into water as needed. Such systems are commonly referred to as regenerative fuel cell systems.

Electrochemical cell systems typically include a number of individual cells arranged in a stack, with the working fluids directed through the cells via input and output conduits or ports formed within the stack structure. The cells within the stack are sequentially arranged, each including a cathode, a proton exchange membrane, and an anode. The cathode and anode may be separate layers or may be integrally arranged with the membrane. Each cathode/membrane/anode assembly (hereinafter "membrane-electrode-assembly", or "MEA") typically has a first flow field in fluid communication with the cathode and a second flow field in fluid communication with the anode. The MEA may furthermore be supported on both sides by screen packs or separator plates that are disposed within, or that alternatively define, the flow fields. Screen packs or separator plates may facilitate fluid movement to and from the MEA, membrane hydration, and may also provide mechanical support for the MEA.

In order to maintain intimate contact between cell components under a variety of operational pressures and over long time periods, uniform compression may be applied to the cell components. Pressure pads or other compression means are often employed to provide compressive force from within the electrochemical cell.

While existing internal components are suitable for their intended purposes, there still remains a need for improvement, particularly regarding providing a cost effective separator plate and cell frames for high pressure electrochemical cells.

BRIEF DESCRIPTION OF THE INVENTION

Embodiments of the invention include a separator plate for an electrochemical cell. The separator plate includes a plurality of protrusions extending therefrom to define a flow field. A pair of end features is arranged along opposite sides of the flow field, each end feature extending substantially the length of the flow field. A periphery portion is provided having a first set of openings and a second set of openings. The first set of openings having a first plurality of openings along a first side of the flow field and the second plurality of openings along an opposing second side of the flow field. The second set of openings having a third plurality of openings adjacent one of the pair of end features and a fourth plurality of openings arranged adjacent the other of the pair of end features. Wherein the plurality of protrusions and pair of end features extend from a plane defined by the periphery portion.

Other embodiments of the invention include a frame for an electrochemical cell. The frame includes a periphery portion having an inner edge that defines a central opening. A first plurality of openings extend through the frame, the first plurality of openings arranged on four sides of the periphery portion about the central opening, the first plurality of openings each having a first diameter. A second opening is arranged in a first corner of the periphery portion, the second opening having a second diameter, the second diameter being smaller than the first diameter. A slot is arranged in a second corner opposite the first corner, the slot having a width that is larger than the second diameter.

Still other embodiments of the invention include an electrochemical cell. A plurality of membrane-electrode-assemblies (MEAs) is provided, each arranged between a first cell separator plate and a second cell separator plate. Wherein at least one of the first cell separator plate and the second cell separator plate comprise a plurality of protrusions extending therefrom to define a flow field. A pair of end features arranged along opposite sides of the flow field, each end feature extending substantially the length of the flow field. A periphery portion is provided having a first set of openings and a second set of openings, the first set of openings having a first plurality of openings along a first side of the flow field and a second plurality of openings along an opposing second side of the flow field, the second set of openings having a third plurality of openings adjacent one of the pair of end features and a fourth plurality of openings arranged adjacent the other of the pair of end features.

In still another embodiment, an electrochemical cell is provided having a plurality of cells. Each cell includes a membrane-electrode-assembly (MEA) arranged between a first cell separator plate and a second cell separator plate. At least one cell of the plurality of cells comprises a first frame member and a porous plate. The first frame member includes an outer periphery and an inner periphery, the first frame member further having a first lip extending from the inner periphery away from the outer periphery. The porous plate is arranged within the inner periphery of the first frame member and is operably coupled to the MEA. The porous plate having a first planer center portion and a first stepped portion that extends about the first planar center portion, the first stepped portion being sized to overlap the first lip.

BRIEF DESCRIPTION OF THE DRAWINGS

Referring to the exemplary drawings wherein like elements are numbered alike in the accompanying Figures.

DETAILED DESCRIPTION OF THE INVENTION

Embodiments of the invention provide a separator plate for an electrochemical cell, where the separator plate defines a flow field formed by a plurality of curvilinear projections or dimples that support a porous plate. The separator plate provides advantages in a cost effective unitary separator plate that is formed from a single sheet of material using a hydroforming process. Still other embodiments include a cell frame that may be used on both the anode and cathode sides of the electrochemical cell. The cell frame further includes bridging elements that support the water and gas passageways. The cell frame still further includes an asymmetric tie-rod opening that facilitates reliable and consistent assembly of the electrochemical cell stack. The separator plate provides advantages in integrating a number of individual parts in the electrochemical cell stack and also reducing manufacturing and labor costs in assembly.

Figure 2:
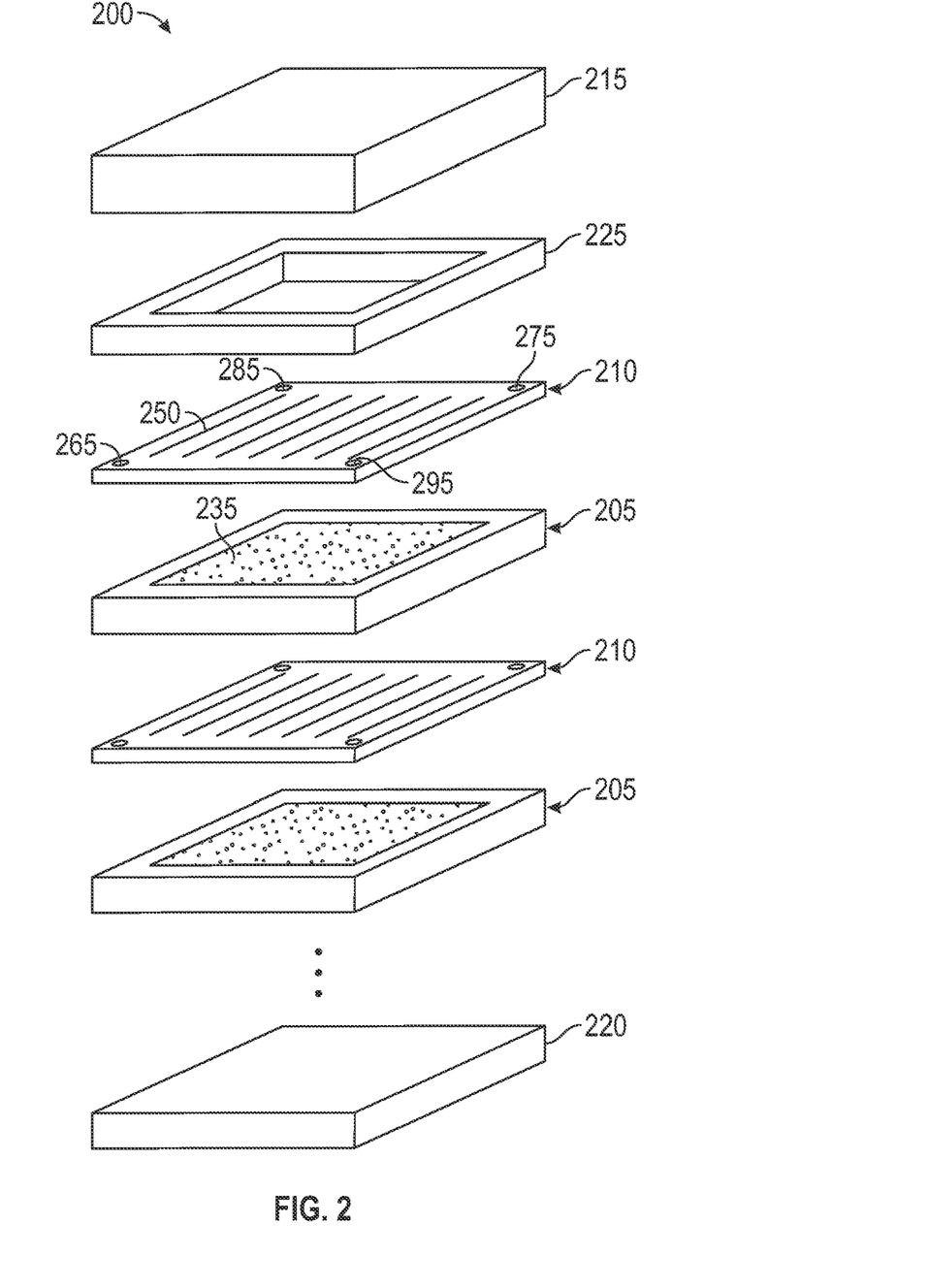
FIG. 2 illustrates an exploded assembly isometric view of an exemplary electrochemical cell in accordance with embodiments of the invention.

Referring first to FIG. 2, an exemplary electrochemical cell 200 that may be suitable for operation as an anode feed electrolysis cell, cathode feed electrolysis cell, fuel cell, or regenerative fuel cell is depicted in an exploded assembly isometric view. Thus, while the discussion below may be directed to an anode feed electrolysis cell, cathode feed electrolysis cells, fuel cells, and regenerative fuel cells are also contemplated. Cell 200 is typically one of a plurality of cells arranged in a cell stack as part of an electrochemical cell system. When cell 200 is used as an electrolysis cell, power inputs are generally between about 1.48 volts and about 3.0 volts, with current densities between about 50 $A/ft^2$ (amperes per square foot) and about 4,000 $A/ft^2$. When used as a fuel cell power outputs range between about 0.4 volts and about 1 volt, and between about 0.1 $A/ft^2$ and about 10,000 $A/ft^2$. The number of cells within the stack, and the dimensions of the individual cells is scalable to the desired cell power output and/or gas output requirements. Accordingly, application of electrochemical cell 200 may involve a plurality of individual cells 200 arranged electrically either in series or parallel depending on the application. Cells 200 may be operated at a variety of pressures, such as up to or exceeding 50 psi (pounds-per-square-inch), up to or exceeding about 100 psi, up to or exceeding about 500 psi, up to or exceeding about 2500 psi, or even up to or exceeding about 10,000 psi, for example.

In an embodiment, cell 200 includes a plurality of membrane-electrode-assemblies (MEAs) 205 alternatively arranged with a plurality of flow field members 210 between a first cell separator plate 215 and a second cell separator plate 220. In the exemplary embodiment, the first and second separator plates 215, 220 are identical. While FIG. 2 illustrates flow field member 210 as a single component, as is discussed in more detail below, the flow field members 210 may be formed from several individual components and may also cooperate with the separator plates 220 to define fluid flow paths. Gaskets 225 may be employed generally for enhancing the seal between the first and second cell separator plates 215, 220 and the associated bipolar plate 210, and between MEA 205 and an adjacent separator plate 210.

Figure 3:
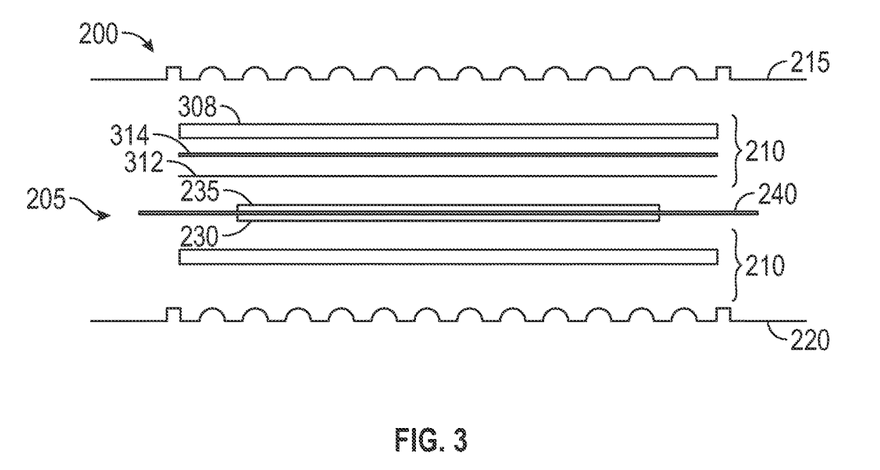
FIG. 3 illustrates an exploded side view of a single cell assembly.

MEA 205 has a first electrode (e.g., anode, or oxygen electrode) 230 and a second electrode (e.g., cathode, or hydrogen electrode) 235 disposed on opposite sides of a proton exchange membrane (membrane) 240, best seen by referring to FIG. 3. Flow field members 210, which are in fluid communication with electrodes 230 and 235 of an adjacent MEA 205, have a structure, to be discussed in more detail below, that define the flow fields adjacent to electrodes 230 and 235, and the sealing thereof. The cell components, particularly cell separator plates 215, 220, flow fields 210, and gaskets 225, may be formed with suitable manifolds or other conduits for fluid flow. In embodiments where a plurality of cells 200 are arranged into an electrochemical cell stack, one of the separator plates 215, 220 may be an end plate for the assembly.

In an embodiment, membrane 240 comprises electrolytes that are preferably solids or gels under the operating conditions of the electrochemical cell. Useful materials include proton conducting ionomers and ion exchange resins. Useful proton conducting ionomers include complexes comprising an alkali metal salt, alkali earth metal salt, a protonic acid, or a protonic acid salt. Useful complex-forming reagents include alkali metal salts, alkaline metal earth salts, and protonic acids and protonic acid salts. Counter-ions useful in the above salts include halogen ion, perchloric ion, thiocyanate ion, trifluoromethane sulfonic ion, borofluoric ion, and the like. Representative examples of such salts include, but are not limited to, lithium fluoride, sodium iodide, lithium iodide, lithium perchlorate, sodium thiocyanate, lithium trifluoromethane sulfonate, lithium borofluoride, lithium hexafluorophosphate, phosphoric acid, sulfuric acid, trifluoromethane sulfonic acid, and the like. The alkali metal salt, alkali earth metal salt, protonic acid, or protonic acid salt is complexed with one or more polar polymers such as a polyether, polyester, or polyimide, or with a network or cross-linked polymer containing the above polar polymer as a segment. Useful polyethers include polyoxyalkylenes, such as polyethylene glycol, polyethylene glycol monoether, and polyethylene glycol diether; copolymers of at least one of these polyethers, such as poly(oxyethylene-co-oxypropylene)glycol, poly(oxyethylene-co-oxypropylene)glycol monoether, and poly(oxyethylene-co-oxypropylene)glycol diether; condensation products of ethylenediamine with the above polyoxyalkylenes; and esters, such as phosphoric acid esters, aliphatic carboxylic acid esters or aromatic carboxylic acid esters of the above polyoxyalkylenes. Copolymers of, e.g., polyethylene glycol with dialkylsiloxanes, maleic anhydride, or polyethylene glycol monoethyl ether with methacrylic acid are known in the art to exhibit sufficient ionic conductivity to be useful.

Ion-exchange resins useful as proton conducting materials include hydrocarbon- and fluorocarbon-type resins. Hydrocarbon-type ion-exchange resins include phenolic resins, condensation resins such as phenol-formaldehyde, polystyrene, styrene-divinyl benzene copolymers, styrene-butadiene copolymers, styrene-divinylbenzene-vinylchloride terpolymers, and the like, that are imbued with cation-exchange ability by sulfonation, or are imbued with anion-exchange ability by chloromethylation followed by conversion to the corresponding quaternary amine.

Fluorocarbon-type ion-exchange resins may include hydrates of tetrafluoroethylene-perfluorosulfonyl ethoxyvinyl ether or tetrafluoroethylene-hydroxylated (perfluoro vinyl ether) copolymers. When oxidation and/or acid resistance is desirable, for instance, at the cathode of a fuel cell, fluorocarbon-type resins having sulfonic, carboxylic and/or phosphoric acid functionality are preferred. Fluorocarbon-type resins typically exhibit excellent resistance to oxidation by halogen, strong acids and bases. One family of fluorocarbon-type resins having sulfonic acid group functionality is NAFION™ resins (commercially available from E. I. du Pont de Nemours and Company, Wilmington, Del.).

Electrodes 230 and 235 may comprise a catalyst suitable for performing the needed electrochemical reaction (i.e., electrolyzing water and producing hydrogen). Suitable catalyst include, but are not limited to, materials comprising platinum, palladium, rhodium, carbon, gold, tantalum, tungsten, ruthenium, iridium, osmium, alloys of at least one of the foregoing catalysts, and the like. Electrodes 230 and 235 may be formed on membrane 240, or may be layered adjacent to, but in contact with, membrane 240.

Figure 4:
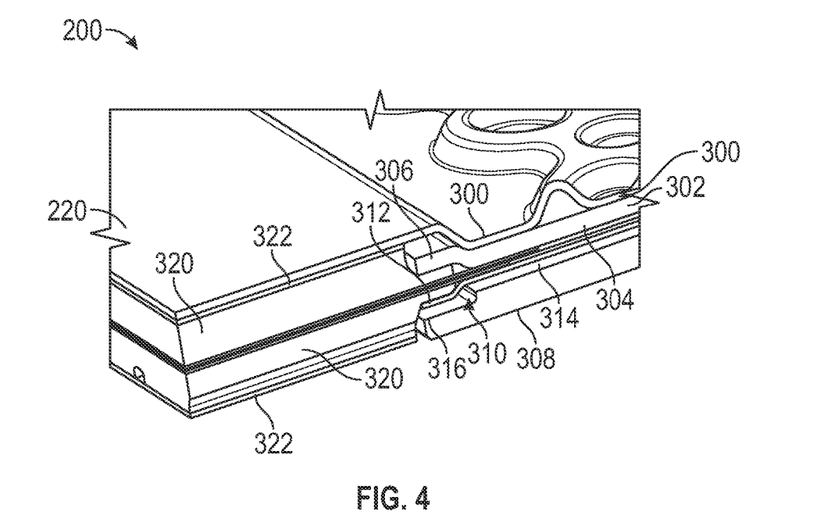
FIG. 4 illustrates a perspective view, partially in section, of the single cell assembly of FIG. 3.
Figure 5:
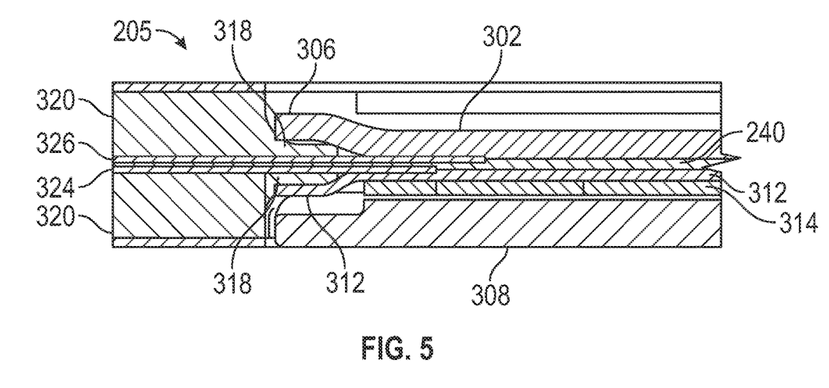
FIG. 5 illustrates a side sectional view of the single cell assembly of FIG. 3.

Referring now to FIGS. 4 and 5, an exemplary embodiment of the cell 200 is shown. In this embodiment, the cell 200 includes a separator plate 220 formed from a single, unitary sheet of titanium. In this embodiment, there is an identical separator plate 215 (not shown for clarity) arranged on the opposite side of the cell 200. As will be discussed in more detail with respect to FIGS. 6-8, the separator plate 215 includes a plurality of curvilinear protrusions 300 or dimples that are integrally formed in the separator plate 215. These protrusions 300 provide an advantage of simultaneously forming a flow field on the anode side of the cell while also supporting the cell structure under the pressure generated by the hydrogen gas.

Adjacent and in contact with the separator plate 220 is a porous plate member 302. In the exemplary embodiment, the porous plate 302 has a generally planar center portion 304 that supports the membrane 240 during operation. The porous plate 302 may further include a stepped portion 306 that extends about the periphery of the porous plate 302. The stepped portion 306 is sized to overlap with a lip 318 on a frame member 320. The porous plate may be formed from sintered titanium for example. The separator plate 220 and the porous plate 302 define a flow field that allows water to flow from an inlet in the frame to the electrode 230 and an oxygen-gas water mix to flow to an outlet. In one embodiment, one or more layers of screens may be disposed between the separator plate 220 and the electrode. The screens may made from a metal, such as niobium, zirconium, tantalum, titanium, carbon steel, stainless steel, nickel, cobalt, and associated alloys, for example. In the exemplary embodiment, the separator plate 220, the porous plate 302 and the porous members are made from an electrically conductive material.

On the opposite side of the cell 200 adjacent and in contact with the separator plate 215 is a carbon insert 308. The carbon insert 308 is made from a conductive thermoset plastic, such as a BMC 8649 graphite/epoxy composite for example. The carbon insert 308 may include channels (not shown) that extend across the length of the carbon insert 308 to facilitate the flow of hydrogen gas from the cell 200. Disposed between the carbon insert 308 and the electrode 235 may be one or more porous members 310, such as but not limited to carbon paper 312, cloth of random carbon fiber 314, woven cloth of carbon strands, woven cloth of multi-strand carbon, or any combination having any of the foregoing materials. In the one embodiment, the carbon insert 308 and the porous members 310 are electrically conductive.

In the exemplary embodiment, the carbon insert 308 includes a recessed portion 316 that extends about the periphery. The recessed portion 316 is sized as a relief to allow the carbon flow field material 312 (e.g. carbon cloth or carbon paper) to extend past the edge of the electrode 235 and overlap with a lip 318 on a frame member 320. As will be discussed in more detail below, in the exemplary embodiment the same frame member 320 may be used on both sides of the MEA 205. The frame members 320 define the periphery of the cell 200. Between the frame members 320 and the adjacent components, such as the separator plates 215, 220 for example, one or more seals 322 may be disposed. Further, the cell 200 may include gaskets 324, 326 disposed between the frame members 320 and the MEA 205. In the exemplary embodiment, the gaskets 324, 326 extend from the outside edge of the frame member 320 inward past the lips 318 to the edge of the electrodes 230, 235. The gaskets 324, 326 may be the same as those described in commonly owned United States patent application entitled "Electrochemical Cell Stack Protector Gasket" filed concurrently herewith 61/941,809, which is incorporated by reference herein.

In one embodiment, the carbon insert 308 includes at least one rib extending from a surface opposite the porous members 310. The at least one rib being sized to fit within a longitudinal portion of a recess created on the side of the separator plate 215 where the end feature 338 (FIG. 7) is formed. In one embodiment, the at least one rib extends linearly and transversely across the length of center portion 336. In another embodiment, the rib may be shaped to include projections that are arranged within the extensions 342.

Figure 6:
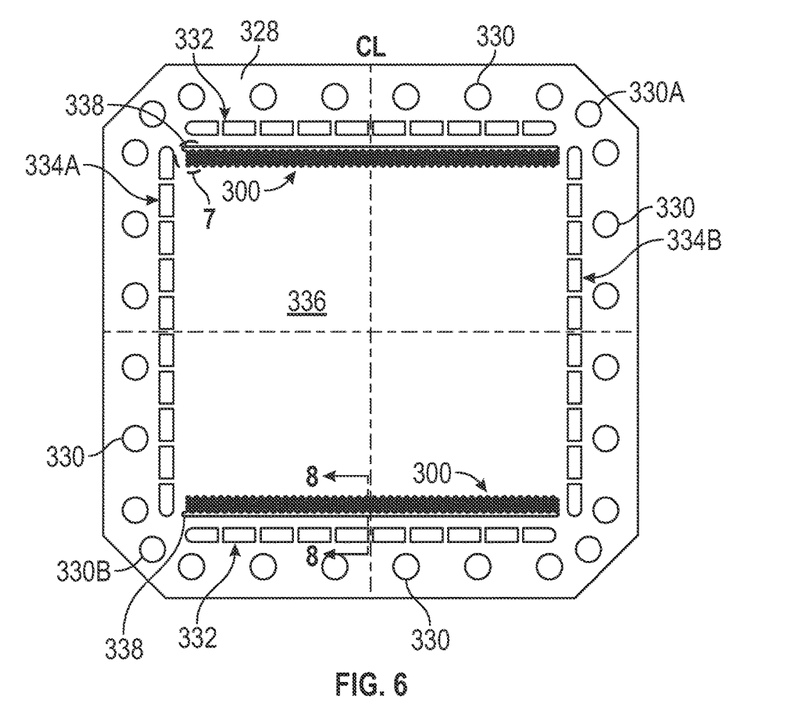
FIG. 6 illustrates a plan view of one side of a separator plate for use in accordance with embodiments of the invention.
Figure 7:
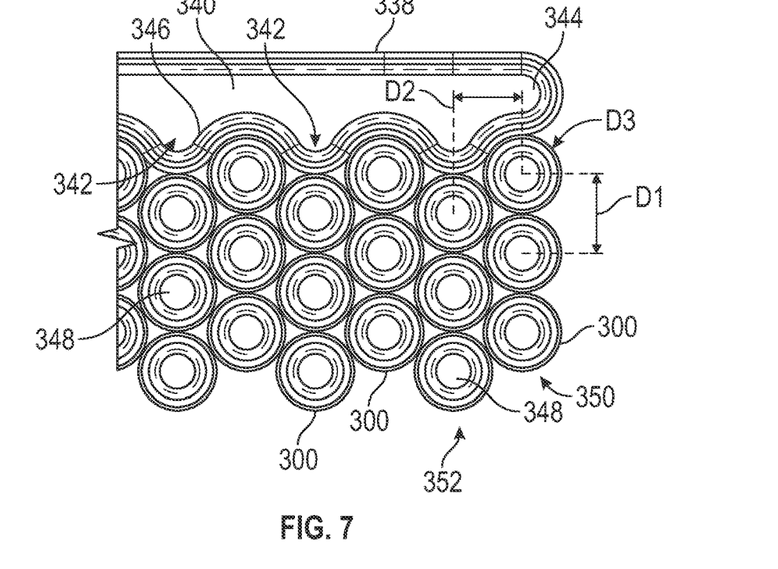
FIG. 7 illustrates an enlarged view of a portion of the separator plate of FIG. 6.
Figure 8:
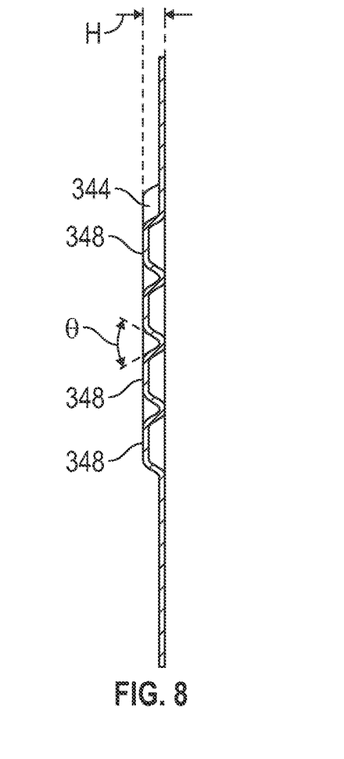
FIG. 8 illustrates a partial sectional view of the separator plate of FIG. 6.

Referring now to FIGS. 6-8, one embodiment of the separator plate 215 is shown. It should be appreciated that while the embodiment is illustrated and described with respect to separator plate 215, in the exemplary embodiment the separator plate 220 is identical. The separator plate 215 includes an outer periphery portion 328 that is generally the same size and shape of the frame members 320. A plurality of openings 330 are formed in the periphery portion 328. The openings 330 are sized to receive tie-rods (not shown) as is known in the art. As will be discussed in more detail below with respect to the frame member 320, one of the openings 330A is formed with a slightly smaller diameter and with a smaller tolerance. Further, another opening 330B is formed as an elongated slot. The arrangement of the openings 330, 330A, 330B allow for precise assembly without having an over constrained condition due to tolerance stack up.

Adjacent the openings 330 are a first set of rectangular openings 332 and a second set of rectangular openings 334. Each of the openings 332, 334 in each set are arranged on opposing sides of a center portion 336. In other words, the center portion 336 is defined by the sets of rectangular openings 332, 334 which extend about the periphery of the center portion 336. The rectangular openings 332, 334 cooperate with corresponding openings and ports in the frame members 320 and any gaskets to form passageways that provide reactants (water) to the cell 200 and removal of products (hydrogen gas, oxygen+water mixture) from the cell 200.

The center portion 336 is formed from a plurality of projections. The plurality of projections includes the dimples or protrusions 300 and a pair of end features 338. It should be appreciated that while FIG. 6 illustrates the center portion 336 as only having protrusions 300 on the edges, this is for clarity and it should be understood that the protrusions 300 extend across and substantially fills the entire center portion 336 between the end features 338. The end features 338 extend along a length of the center portion 336 adjacent the first set of rectangular openings 332. In the exemplary embodiments, the longitudinal axis of the end features 338 is generally parallel to the flow of reactant (water). In other words, reactant water enters the cell 200 via the second set of rectangular openings 334A flows across the center portion 336 (via at least partially through the space between the protrusions 300) and the product exits the cell 200 via the opposite rectangular openings 334B.

The end features 338 include a body portion 340 (FIG. 7) with a plurality of extensions 342 that extend toward the center of the center portion 336. The extensions 342 have a generally curved shape that is complementary of the shape of the protrusions 300. In the exemplary embodiment, the extensions have an radius 346 of 0.1 inches (2.54 mm) and the end features 338 have a height "H" from the planar outer periphery portion 328 of 0.0325 inches (0.826 mm). Each end 344 of the end features 338 is curved to have a complementary shape with the protrusions 300.

The protrusions 300 form two separate alternating rows 350, 352 that repeat across the center portion 336. The row 350 is aligned with the valley between the extensions 342, while the row 352 is aligned with the peak of the extensions 342. Thus the rows 350, 352 are adjacent and offset from each other. In the exemplary embodiment, each protrusion 300 includes a generally circular base portion that tapers to a generally planar end portion 348. The protrusions 300 have a sidewall that extends down on an angle θ from the planar end portion 348. It should be appreciated that the planar end portions 348 provide a support surface for the porous plate 302. In one embodiment the angle θ between adjacent sidewalls is 60 degrees. The distance "D1" between the centers of adjacent protrusions 300 within a given row 350, 352 is generally slightly larger than the distance "D2" between protrusions 300 in adjacent rows 350, 352 to define a fluid flow path that facilitates the reactant water to flow along the length of the separator plate 215. In the exemplary embodiment, the distance D1 is 0.127 inches (3.226 mm), the distance D2 is 0.111 inches (2.819 mm) and the base diameter "D3" of the protrusion 300 is 0.126 inches (3.2 mm). In one embodiment, the separator plate 215 is made from a hydroformed sheet of titanium. It should be appreciated that the dimensions provided herein provide advantages in allowing the separator plate 215 to be formed via a hydroforming process without cracking the titanium material and while still providing sufficient strength to support the porous plate 302.

Figure 9:
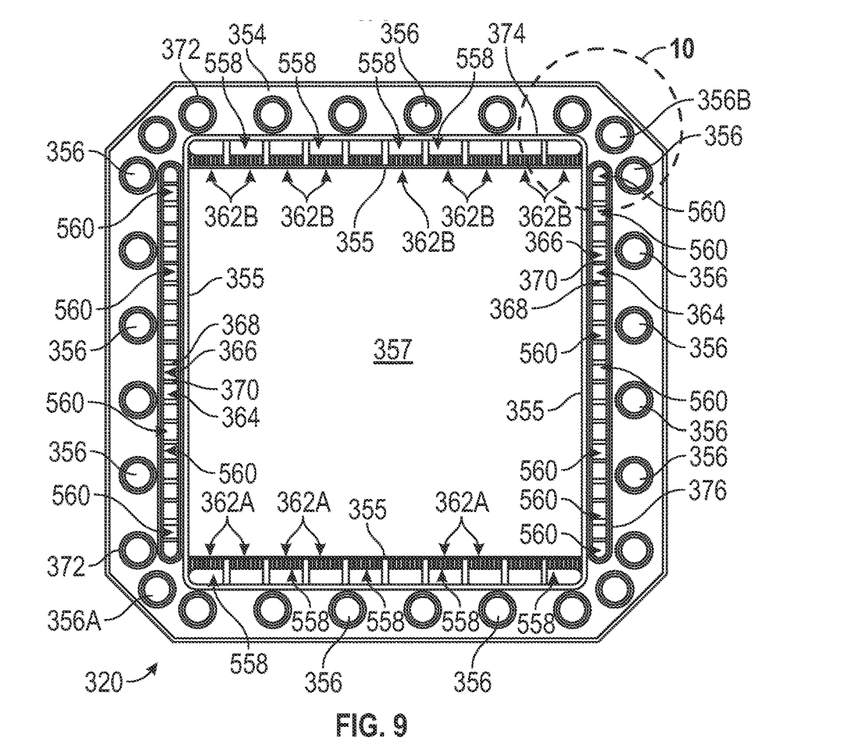
FIG. 9 illustrates a plan view of a electrochemical cell frame for use in accordance with embodiments of the invention.
Figure 10:
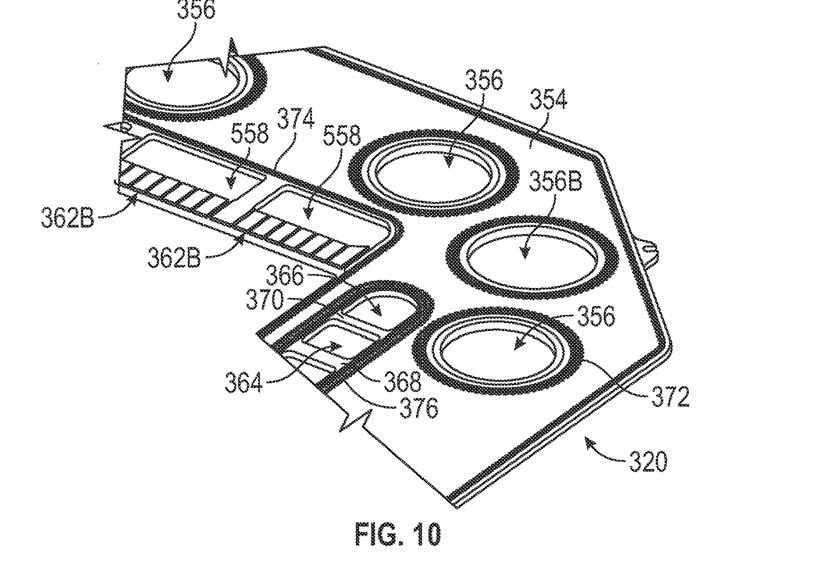
FIG. 10 illustrates a partial enlarged view of a portion of the electrochemical cell frame of FIG. 9.

Referring now to FIGS. 9-10, an exemplary frame member 320 is shown. As discussed above, the frame member 320 is "reversible" such that it may be used on both the cathode and anode sides of the cell 200. The frame member 320 includes an outer periphery portion 354 that is generally the same size and shape as the separator plate 215. A plurality of openings 356 are formed in the outer periphery portion 354. The inner edge 355 of outer periphery portion 354 defines an opening 357. The openings 356 are sized to receive tie-rods (not shown) as is known in the art. It should be appreciated that the openings 356 align with the openings 330 of the separator plate 215. In one corner of frame member 320, an opening 356A is formed with a slightly smaller diameter and with a smaller tolerance. Further another opening 356B is formed as an elongated slot. The arrangement of the openings 356, 356A, 356B allow for precise assembly without having an over constrained condition due to tolerance stack-up.

Arranged between the openings 356 and the edge 355 are a first set of rectangular openings 558 and a second set of openings 560. Extending between each of the first set of rectangular openings 558 and the opening 357 are a plurality of flow channels 362. The flow channels 362 are oriented towards the center area of the frame member 320 to define a flow path for fluids into and out of the cell 200. It should be appreciated that when the frame member 320 is arranged on the anode side of the cell 200, the flow channels 362A allow the reactant (e.g. water) to flow from the conduits defined by the rectangular openings 558 and into the flow field defined by the protrusions 300 of separator plate 220. The reactant flows across the width of the cell 200 with a portion of the reactant being electrolyzed by the electrode 230. The resulting water plus oxygen gas mixture is transported to the flow channels 362B and into the connected openings 558 where the mixture exits the cell 200.

Similarly, when the frame member 320 is used on the cathode side of the cell 200, hydrogen gas is formed at the cathode electrode 235 (FIG. 3). The hydrogen flows through the carbon paper and fiber 312, 324 and into channels (not shown) formed in the carbon insert to the flow channels 362, allowing the hydrogen gas to exit the cell 200. In the exemplary embodiment, each rectangular opening 358 is fluidly coupled to eight (8) flow channels 362, with each of the flow channels 362 has a width of between 0.001-0.0070 inches (0.0254-1.778 mm) and between 0.001-0.070 inches (0.0254-1.778 mm) deep. In one embodiment, the flow channels 362 are 0.020 inches (0.508 mm) wide and 0.020 inches (0.508 mm) deep.

In the exemplary embodiment, each of the second set of rectangular openings 560 are comprised of a first port 364 and a second port 366. Each pair of ports 364, 366 cooperate to fluidly couple with one of the openings 558 in adjacent frame members 320 to define a fluid passageway for either the reactant (water) or the product). Adjacent pairs of ports are separated by a wall 368. Arranged between the ports 364, 366 is a bridge portion 370. In the exemplary embodiment, the bridge portion 370 has a width that is smaller than the width of wall 368. The bridge portion 370 provides advantages in supporting the walls of the frame member 320 to withstand the internal pressures generated by the product (e.g. hydrogen gas) during operation. In the exemplary embodiment, the port 364 is smaller than the port 366. In one embodiment, the port 364 has a width of 0.269 inches (6.833 mm) and the port 366 has a width of 0.361 inches (9.169 mm).

The frame member 320 further includes features to facilitate sealing of the cell 200. In one embodiment, the sealing features 372, 374, 376 are arranged about each of the openings 356, 358, 360. These sealing features 372, 374, 376 may comprise a plurality of ridges that extend about the periphery of the openings 356, 358, 360. These ridges engage either the gasket member, such as seal 322 (FIG. 4) for example, or the membrane 249 for example. The sealing features 372, 374, 376 assist in holding the gasket/seal members and membrane in place under the operating pressures.

Accordingly, and as disclosed, some embodiments of the invention may include some of the following advantages: a separator plate having a flow field defined by a plurality of protrusions formed from a single sheet of titanium by hydroforming; a separator plate having a support element extending along opposite sides of the flow field that is sized to support a porous plate; a frame member that is usable on both the anode and cathode sides of the cell; a frame member having a plurality of openings that are supported by a bridge member.

In one embodiment, an electrochemical cell is provided having a plurality of cells. Each cell includes a membrane-electrode-assembly (MEA) arranged between a first cell separator plate and a second cell separator plate. At least one cell of the plurality of cells comprises a first frame member and a porous plate. The first frame member includes an outer periphery and an inner periphery, the first frame member further having a first lip extending from the inner periphery away from the outer periphery. The porous plate is arranged within the inner periphery of the first frame member and is operably coupled to the MEA. The porous plate having a first planer center portion and a first stepped portion that extends about the first planar center portion, the first stepped portion being sized to overlap the first lip.

In another embodiment the at least one cell of the plurality of cells further comprises a second frame member and a porous member. The second frame member having an outer periphery and an inner periphery, the second frame member further having a second lip extending from the inner periphery away from the outer periphery. The porous member is arranged within the inner periphery of the second frame member and is operably coupled to the MEA opposite the porous plate. The porous member having a second planer center portion and a second stepped portion that extends about the second planar center portion, the second stepped portion being sized to overlap the second lip. In one embodiment the porous member may be selected from a group comprising: carbon paper, cloth of random carbon fiber, woven cloth of carbon strands, woven cloth of multi-strand carbon and a combination of the foregoing. The second frame member may be identical to the first frame member.

In another embodiment the MEA includes a first electrode disposed between a proton exchange membrane and the porous plate, the first electrode being sized to fit within an area defined by the first lip. The MEA may further includes a second electrode operably coupled to the proton exchange membrane opposite the first electrode, the second electrode being sized to fit within an area defined by the second lip. In one embodiment, the porous member is sized to fit within an area defined by the second stepped portion.

In still another embodiment, the porous member is comprised of a plurality of layers of porous members. The plurality of layers of porous members may include a layer made from a cloth of random carbon fiber and a layer of carbon paper, the layer of carbon paper being disposed between the layer of cloth of random carbon fiber and the second electrode.

In another embodiment, the at least one cell of the plurality of cells further comprises a carbon insert arranged adjacent the porous member opposite the porous plate. The carbon insert includes a recess portion that extends about the periphery of the carbon insert, the recess portion having a surface at least partially parallel to and offset from the second stepped portion.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A separator plate for an electrochemical cell, comprising:
   a plurality of protrusions extending therefrom to define a non-linear flow field in a flow direction, wherein the plurality of protrusions comprises a plurality of protrusions having a circular base portion and a substantially planar end portion, wherein the plurality of protrusions are comprised of alternating pairs of a first row of protrusions and a second row of protrusions, wherein the second row of protrusions is offset from the first row of protrusions, wherein the offset is larger than a distance from the first row of protrusions to the second row of protrusions in a direction generally parallel to the flow of reactant;
   a pair of end features arranged along opposite sides of the flow field, each end feature extending substantially the length of the flow field in a direction parallel to the flow direction, wherein each of the end features includes a body portion having a plurality of extensions that extend toward a center portion of the separator plate and a stepped portion defining an edge in a direction parallel to the flow direction, wherein the plurality of extensions has a curved shape that is complementary to a shape of the neighboring protrusions;

a periphery portion having a first set of openings and a second set of openings, the first set of openings having a first plurality of openings along a first side of the flow field and a second plurality of openings along an opposing second side of the flow field, the second set of openings having a third plurality of openings adjacent one of the pair of end features and a fourth plurality of openings arranged adjacent the other of the pair of end features; and wherein the plurality of protrusions and the pair of end features extend from a plane defined by the periphery portion.

2. The separator plate of claim 1 wherein the separator plate is made by hydroforming from a single, unitary sheet of titanium.

3. The separator plate of claim 1 wherein the periphery portion includes a plurality of tie-rod openings, the plurality of tie-rod openings including a first tie-rod opening in a first corner having a first diameter and a tie-rod slot arranged in an opposite corner from the first tie-rod opening.

4. An electrochemical cell, comprising:
a plurality of membrane-electrode-assemblies (MEAs), each arranged between a first cell separator plate and a second cell separator plate;
wherein at least one of the first cell separator plate and the second cell separator plate comprises:
a plurality of protrusions extending therefrom to define a non-linear flow field in a flow direction, wherein the plurality of protrusions comprises a plurality of protrusions having a circular base portion and a substantially planar end portion, wherein the plurality of protrusions are comprised of alternating pairs of a first row of protrusions and a second row of protrusions, wherein the second row of protrusions is offset from the first row of protrusions, wherein the offset is larger than a distance from the first row of protrusions to the second row of protrusions in a direction generally parallel to the flow of reactant;
a pair of end features arranged along opposite sides of the flow field, each end feature extending substantially the length of the flow field in a direction parallel to the flow direction, wherein each of the end features includes a body portion having a plurality of extensions that extend toward a center portion of the separator plate and a stepped portion defining an edge in a direction parallel to the flow direction, wherein the plurality of extensions has a curved shape that is complementary to a shape of the neighboring protrusions; and
a periphery portion having a first set of openings and a second set of openings, the first set of openings having a first plurality of openings along a first side of the flow field and a second plurality of openings along an opposing second side of the flow field, the second set of openings having a third plurality of openings adjacent one of the pair of end features and a fourth plurality of openings arranged adjacent the other of the pair of end features.

5. The electrochemical cell of claim 4, wherein:
the plurality of protrusions comprises a plurality of protrusions having a circular base portion and a substantially planar end portion; and
the plurality of protrusions are comprised of alternating pairs of a first row of protrusions and a second row of protrusions, wherein the second row of protrusions is offset from the first row of protrusions.

6. The electrochemical cell of claim 4 further comprising:
a frame member disposed between each MEA and the first cell separator plate;
wherein each frame member comprises:
a periphery portion having an inner edge that defines a central opening;
a fifth plurality of openings extending through the frame member, the fifth plurality of openings arranged on four sides of the periphery portion, the fifth plurality of openings each having a first diameter;
a second opening arranged in a first corner of the periphery portion, the second opening having a second diameter, the second diameter being smaller than the first diameter; and
a slot arranged in a second corner opposite the first corner, the slot having a width that is larger than the second diameter.

7. The electrochemical cell of claim 6, wherein the frame member further comprises:
a first set of rectangular openings, the first set of rectangular openings including a first plurality of rectangular openings and an opposing second plurality of rectangular openings, the first plurality of rectangular openings arranged between the fifth plurality of openings and the central opening, the second plurality of rectangular openings being arranged between the fifth plurality of openings and the central opening opposite the first plurality of rectangular openings; and
flow channels disposed between the central opening and each of the openings in the first set of rectangular openings.

8. An electrochemical cell, comprising:
a plurality of cells, each cell having a membrane-electrode-assembly (MEA) arranged between a first cell separator plate and a second cell separator plate;
wherein at least one of the first cell separator plate and the second cell separator plate comprises:
a plurality of protrusions extending therefrom to define a non-linear flow field in a flow direction, wherein the plurality of protrusions comprises a plurality of protrusions having a circular base portion and a substantially planar end portion, wherein the plurality of protrusions are comprised of alternating pairs of a first row of protrusions and a second row of protrusions, wherein the second row of protrusions is offset from the first row of protrusions, wherein the offset is larger than a distance from the first row of protrusions to the second row of protrusions in a direction generally parallel to the flow of reactant;
a pair of end features arranged along opposite sides of the flow field in a direction parallel to the flow direction, each end feature extending substantially the length of the flow field, wherein each of the end features include a body portion having a plurality of extensions that extend toward a center portion of the separator plate and a stepped portion defining an edge in a direction parallel to the flow direction, wherein the plurality of extensions has a curved shape that is complementary to a shape of the neighboring protrusions; and
a periphery portion having a first set of openings and a second set of openings, the first set of openings having a first plurality of openings along a first side of the flow field and a second plurality of openings along an opposing second side of the flow field, the second set of openings having a third plurality of openings adjacent one of the pair of end features and a fourth plurality of openings arranged adjacent the other of the pair of end features, wherein at least one cell of the plurality of cells comprises:
a first frame member having an outer periphery and an inner periphery, the first frame member further having a first lip extending from the inner periphery away from the outer periphery; and
a porous plate arranged within the inner periphery of the first frame member and operably coupled to the MEA, the porous plate having a first planar center portion and a first stepped portion that extends about the first planar center portion, the first stepped portion being sized to overlap the first lip.

9. The electrochemical cell of claim 8 wherein the at least one cell of the plurality of cells further comprises:
a second frame member having an outer periphery and an inner periphery, the second frame member further having a second lip extending from the inner periphery away from the outer periphery; and
a porous member within the inner periphery of the second frame member and operably coupled to the MEA opposite the porous plate, the porous member having a second planar center portion and a second stepped portion that extends about the second planar center portion, the second stepped portion being sized to overlap the second lip.

10. The electrochemical cell of claim 9 wherein the porous member is selected from a group comprising: carbon paper, cloth of random carbon fiber, woven cloth of carbon strands, woven cloth of multi-strand carbon and a combination of the foregoing.

11. The electrochemical cell of claim 9 wherein the MEA includes a first electrode disposed between a proton exchange membrane and the porous plate, the first electrode being sized to fit within an area defined by the first lip.

12. The electrochemical cell of claim 11 wherein the MEA further includes a second electrode operably coupled to the proton exchange membrane opposite the first electrode, the second electrode being sized to fit within an area defined by the second lip.

13. The electrochemical cell of claim 12 wherein the porous member is sized to fit within an area defined by the second stepped portion.

14. The electrochemical cell of claim 13 wherein the porous member is comprised of a plurality of layers of porous members.

15. The electrochemical cell of claim 14 wherein the plurality of layers of porous members includes a layer made from a cloth of random carbon fiber and a layer of carbon paper, the layer of carbon paper being disposed between the layer of cloth of random carbon fiber and the second electrode.

16. The electrochemical cell of claim 9 wherein the at least one cell of the plurality of cells further comprises a carbon insert arranged adjacent the porous member opposite the porous plate, the carbon insert having a recess portion that extends about a periphery of the carbon insert, the recess portion having a surface at least partially parallel to and offset from the second stepped portion.

17. The electrochemical cell of claim 9 wherein the second frame member is identical to the first frame member.

18. The electrochemical cell of claim 4, wherein the electrochemical cell is an electrolysis cell.

* * * * *